US011233702B2

(12) United States Patent
Navare et al.

(10) Patent No.: US 11,233,702 B2
(45) Date of Patent: *Jan. 25, 2022

(54) CLOUD SERVICE INTERDEPENDENCY RELATIONSHIP DETECTION

(71) Applicant: BMC Software, Inc., Houston, TX (US)

(72) Inventors: Nitin Navare, Saratoga, CA (US); Sridhar Sodem, Cupertino, CA (US); Joseph Scarpelli, Half Moon Bay, CA (US); Mark Rivington, Godalming (GB)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,255

(22) Filed: Jan. 15, 2021

(65) Prior Publication Data

US 2021/0135949 A1 May 6, 2021

Related U.S. Application Data

(63) Continuation of application No. 15/476,478, filed on Mar. 31, 2017, now Pat. No. 10,931,532.

(51) Int. Cl.
*H04L 12/24* (2006.01)
*H04L 29/08* (2006.01)
*H04L 12/26* (2006.01)

(52) U.S. Cl.
CPC ............ *H04L 41/12* (2013.01); *H04L 41/142* (2013.01); *H04L 41/5058* (2013.01); *H04L 43/0817* (2013.01); *H04L 67/1008* (2013.01)

(58) Field of Classification Search
CPC ..... H04L 41/12; H04L 41/142; H04L 43/045; H04L 43/16; H04L 67/1008
See application file for complete search history.

(56) References Cited

U.S. PATENT DOCUMENTS 10,505,826 B2 * 12/2019 Poola ..................... H04L 67/10
2012/0137367 A1 5/2012 Dupont et al.
(Continued)

OTHER PUBLICATIONS

BMC documentation "BMC Atrium Discovery and Dependency Mapping 10.0" (version 0.12 Fab 10 2015) to BMC. ("BMC-Atrium") i (Year: 2015).*
(Continued)

*Primary Examiner* — June Y Sison
(74) *Attorney, Agent, or Firm* — Brake Hughes Bellermann LLP

(57) ABSTRACT

A computer system includes a processor, a memory, a data collector, a relationships analyzer, and a topological map generator. The data collector retrieves performance data in a specific set of performance categories for computing resources in a computing system for a time interval. The relationships analyzer, for each computing resource-to-computing resource pair in the computing system, performs a correlation analysis of the respective behavior values of the computing resources in the pair, and identifies the computing resource-to-computing resource pairs that have correlation values exceeding a pre-determined threshold level as having performance interdependencies. The topological map generator prepares an undirected graph of the computing resources that have performance interdependencies, and displays the undirected graph as a topographic map of the computing resources in the computing system.

20 Claims, 7 Drawing Sheets

(56) References Cited

U.S. PATENT DOCUMENTS

| | | |
|---|---|---|
| 2015/0033086 A1 | 1/2015 | Sasturkar et al. |
| 2015/0261215 A1 | 9/2015 | Blevins et al. |
| 2015/0358391 A1 | 12/2015 | Moon et al. |
| 2016/0078356 A1 | 3/2016 | Dang et al. |
| 2016/0224898 A1 | 8/2016 | Ryckbosch et al. |
| 2018/0248902 A1 | 8/2018 | Dănilă-Dumitrescu et al. |
| 2018/0295014 A1 | 10/2018 | Huang et al. |
| 2018/0365090 A1 | 12/2018 | Ben Simhon et al. |

OTHER PUBLICATIONS

U.S. Appl. No. 15/476,478, filed Mar. 31, 2017.
Dubey et al.; "Agent-Less Hardware Monitoring Tool for Cluster Management"; International Journal of Advanced Research in Computer Science and Software Engineering; vol. 3, ISSUE 9, Sep. 2013; pp. 477-480.
Vogler et al.; "Non-Intrusive Monitoring of Stream Processing Applications"; Proc. 10th IEEE Int'l Symp. Service-Oriented System Eng, 2016; 10 Pages.
"BMC Atrium Discovery and Dependency Mapping 10.0", Security Target; Version 0.12, Feb. 10, 2015, 61 pages.

* cited by examiner

Server "A"

Example raw performance data

| Timestamp | 1488499199 | 1488499200 | 1488499201 | 1488499202 | 1488499203 |
|---|---|---|---|---|---|
| CPU Utilization | 0.010349 | 0.21367 | 0.13876 | 0.02349 | 0.08638 |
| Disk Reads | 0 | 23764 | 67452 | 458743 | 0 |
| Disk Writes | 208896 | 450996 | 103823 | 266035 | 32946 |
| Memory Utilization | 0.419137 | 0.42789 | 0.491137 | 0.484137 | 0.419137 |
| Context Switches | 30873 | 10874 | 25965 | 74327 | 11234 |

Table 400

FIG. 4A

Server "A"

Example Standardized Data (value - mean) / stddev

| Timestamp | 1488499199 | 1488499200 | 1488499201 | 1488499202 | 1488499203 |
|---|---|---|---|---|---|
| CPU Utilization | -1.117944287 | 1.582214779 | 0.587389279 | -0.943428175 | -0.1082316 |
| Disk Reads | -0.624573128 | -0.48963256 | -0.24155633 | 1.980335151 | -0.62457313 |
| Disk Writes | -0.025284196 | 1.654915613 | -0.75450202 | 0.371266555 | -1.24639595 |
| Memory Utilization | -0.900737744 | -0.63027479 | 1.324023241 | 1.107727034 | -0.90073774 |
| Context Switches | 0.009402357 | -0.85157633 | -0.20189238 | 1.88014428 | -0.83607793 |

Table 410

FIG. 4B

Server "A"

Example One Dimensional Data

| Timestamp | 1488499199 | 1488499200 | 1488499201 | 1488499202 | 1488499203 |
|---|---|---|---|---|---|
| One dimension data | -0.34092 | -1.65525 | 0.11959 | 3.06638 | -1.18981 |

Table 420

FIG. 4C

| | Timestamp | 1488499199 | 1488499200 | 1488499201 | 1488499202 | 1488499203 |
|---|---|---|---|---|---|---|
| data set 441 → | Server A | -0.34092 | -1.65525 | 0.11959 | 3.06638 | -1.18981 |
| data set 442 → | Server B | -0.0068184 | -0.33105 | -0.047836 | -0.0613276 | -0.0237962 |
| | Correlation coefficient "r" | | | | | 0.387850703 |

Table 430

FIG. 4D maximum ▼

| CV | 0 | 0.00816 | 0.06024 | 0.11276 | 0.11192 | 0.38756 | -0.1183 | -0.9552 | 0.362 | 0.0119 | 0 |
|---|---|---|---|---|---|---|---|---|---|---|---|
| Lag | -5 | -4 | -3 | -2 | -1 | 0 | 1 | 2 | 3 | 4 | 5 |

Table 440

FIG. 4E

Example of X-correlation of other data maximum ▼

| CV | -0.01538 | 0.050931 | -0.383665651 | 0.287461407 | 0.175269449 | 0.344784791 | -0.71350309 | 0.234468624 | 0.76290499 | -0.0466588 | -0.83553 |
|---|---|---|---|---|---|---|---|---|---|---|---|
| Lag | -5 | -4 | -3 | -2 | -1 | 0 | 1 | 2 | 3 | 4 | 5 |

Table 450

FIG. 4F

CLOUD SERVICE INTERDEPENDENCY RELATIONSHIP DETECTION

CROSS-REFERENCE TO RELATED APPLICATION

This application is a continuation of, and claims priority to, U.S. patent application Ser. No. 15/476,478, filed on Mar. 31, 2017, entitled "CLOUD SERVICE INTERDEPENDENCY RELATIONSHIP DETECTION," the disclosure of which is incorporated by reference herein in its entirety.

TECHNICAL FIELD

This description relates to network connections between components of a networked computing system.

BACKGROUND

Cloud computing or networked computing is a type of computing that provides shared computer processing resources and data to computers and other devices on demand. Cloud computing implementations can enable ubiquitous, on-demand access to a pool of shared computing resources (e.g., computer networks, servers, virtualized servers, storage, application services, etc.), which can be rapidly provisioned. The computing resources can be connected by public networks and or private networks to create the pool of shared computing resources. When applications are run, computing resources can be allocated from the pool of shared computing resources and connected to a user as needed.

Cloud computing providers can rapidly or dynamically adjust or reconfigure the pool of shared computing resources, for example, to meet fluctuating and unpredictable demand. Application services provided in the cloud computing environment can be affected by the reconfiguration of the computing resources (e.g., due to changes in network connections, or due to the addition or removal of computing resources, often in real-time, from the shared pool of computing resources).

Consideration is now being given to identifying the network connections and application/network relationships that can impact application services in cloud computing environments.

SUMMARY

A computer system for generating topological maps of the distribution of networked computing resources in a cloud computing system is described herein. The networked computing resources in the cloud computing system may, for example, include one or more of computer networks, servers, virtualized servers, storage, application services, compute services, etc.

In a general aspect, the computer system includes a processor, a memory, a data collector, a relationships analyzer and a topological map generator.

In an aspect, the data collector retrieves performance data of the computing resources in the cloud computing system for a time interval. The retrieved performance data can include performance data in one or more performance categories (e.g., CPU utilization, context switches, load average, disk reads, disk writes, and network bandwidth usage).

In an aspect, the relationships analyzer performs dimensionality reduction of the retrieved performance data using principal component analysis (PCA) to arrive at a single behavior value (BV) for each of the computing resources in the computing system, and for each computing resource-to-computing resource pair in the cloud computing system, performs a correlation analysis of the respective behavior values of the computing resources in the pair. The relationships analyzer further identifies computing resource-to-computing resource pairs that have correlation values exceeding a pre-determined threshold level as having performance interdependencies.

In an aspect, the topological map generator prepares an undirected graph of the computing resources that have performance interdependencies. The undirected graph of the computing resources that have performance interdependencies is displayed as a topographic map of the computing resources in the computing system.

The details of one or more implementations are set forth in the accompanying drawings and the description below. Other features will be apparent from the description and drawings, and from the claims.

BRIEF DESCRIPTION OF THE DRAWINGS

FIG. 4A is an illustration of an example set of performance data of a server, which may be collected at different times in an example cloud computing system, in accordance with the principles of the present disclosure.

FIG. 4B is an illustration of a table representing a set of standardized performance data obtained by standardizing the set of performance data of FIG. 4A, in accordance with the principles of the present disclosure.

FIG. 4C is an illustration of the results of example dimensionality reduction of the set of standardized performance data of FIG. 4B using principal component analysis (PCA) to arrive at a one-dimensional single behavior values (BV), in accordance with the principles of the present disclosure.

FIG. 4D is an illustration of example data sets for servers A and B, respectively, that may be correlated by the method of FIG. 3, in accordance with the principles of the present disclosure.

FIG. 4E is an illustration of example cross correlation results (e.g., for server A and server B) that indicate that the maximum correlation value (CV) can occur at a time lag equal to zero, in accordance with the principles of the present disclosure.

FIG. 4F is an illustration of example cross correlation results (e.g., for another server pair) that indicate that the maximum correlation value (CV) can occur at a non-zero time lag, in accordance with the principles of the present disclosure.

DETAILED DESCRIPTION

Figure 1:
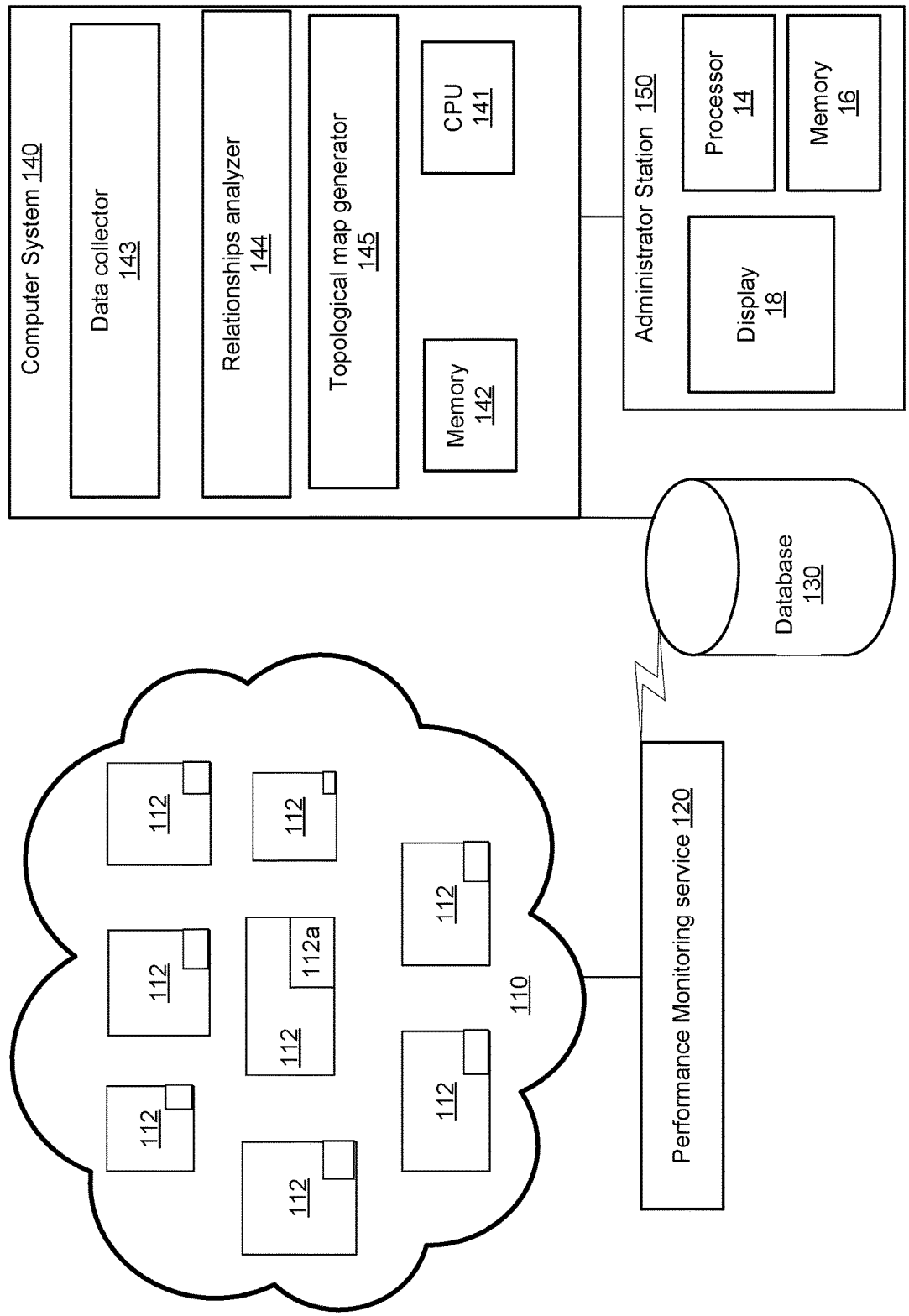
FIG. 1 is an illustration of an example system for determining the topology of the distribution of computing resources in a networked computer system (e.g. cloud computing system) based on identification of performance interdependencies of the computing resources, in accordance with the principles of the present disclosure.

Systems and methods for determining the topology of computing resources in a networked computer system are described herein. The networked computer system (e.g., "a cloud computing system") may include a shared pool of configurable computing resources (e.g., computer networks, servers, storage, applications and services). The computing resources may include virtualized computing resources (e.g., virtual servers).

A key aspect of the structure of a modern networked computer system (hereinafter "a cloud computing system") is the dynamic and scalable nature of the network of computing resources (components) and their inter-connections in the system. Components can be added to, or removed from, the system in real-time either through human action or through automated systems controls. The network of components and their inter-connections in the cloud computing system can change as the system is dynamically scaled or reconfigured in response to, for example, increase or decrease in load (i.e. network traffic). Further, the cloud computing system may be required provide interrupted (application) services continuously at all times even with no provision for the system to be shut down (even briefly) for maintenance, upgrade or repair. Components of the cloud computing system may be subject to modification or removal in real time without system down-time.

Knowledge of the cloud computing system's topology (i.e., the number and type of the system components, and how they are related or connected to each other) will be useful for properly managing changes to the cloud computing system (i.e., removing, modifying, or replacing a component). Removing, modifying, or replacing a component based on inaccurate understanding of the topology of the system components can lead to system failure, for example, when an "incorrect" component is removed, modified, or replaced. In the same way that a surgeon may rely on MRI or CT scan images of a patient to guide surgery on that patient, an IT professional may need an up-to-date configuration diagram or map, which shows all of the components and the connections between the components, to guide changes to the cloud computing system.

Traditional discovery tools for determining the topology of a computer system rely on intrusive agent software to detect or observe direct connections between components of the computer system (e.g., by intercepting network packets, or tapping into the network traffic through proprietary hardware connected to the physical network in the path of all server to server connections). The intrusive agent software must run on all of the servers or other computing resources of the computer system to detect the direct connections. The processes to collate and analyze all of the agent output data for all of the servers or other computing resources of the computer system can be time consuming and resource hungry. Further, inaccuracies in the observed data received from multiple agents can lead to an inconclusive topology determination for the computer system. Furthermore, the traditional discovery tools are not useful in cloud computing environments in which network components can be implemented not only in in hardware, but also in software. The traditional discovery tools are also not useful in cloud computing environments in which some network components (e.g., Elastic Load Balancers that act as intermediaries between other components) can effectively create opaque "network black-holes" that block observation of direct connections between upstream components.

In contrast to the traditional discovery tools, the solutions for topology determination that are described herein may rely on indirect detection of connections between computing resources of a cloud computing system, in accordance with the principles of the present disclosure. These solutions involve recognizing a topological connection between two computing resources based on detection of a performance or service interdependency relationship between the two computing resources. The solutions include a method for detecting performance or service relationships across servers and micro services in public cloud environments.

FIG. 1 is a block diagram that illustrates an example system 100 for determining the topology of computing resources in a networked computer system (e.g. cloud computing system 110), in accordance with the principles of the present disclosure. System 100 may determine the topology of computing resources in the networked computer system based on discovery of performance interdependencies of the computing resources in the networked computer system.

Cloud computing system 110 may include a plurality of computing resources 112 (e.g., real and virtual server instances, compute services, etc.). Cloud computing system 110 may provide digital service applications in a cloud computing environment that uses auto-scaling techniques to scale up and scale down the number of server instances, service containers (e.g. Docker), and micro-service instances running at a specific time to support those digital services. Further, cloud computing system 110 may be hosted, for example, on one or more of public clouds, private clouds or hybrid clouds. It may be noted that public cloud services may not provide any visibility in to the network layer and the network connections between separate cloud instances and other service components of cloud computing system 110. Cloud computing system 110 may be implemented using a micro-service architecture model. Such a micro-service architecture model implementation of cloud computing system 110 may increase the number of interdependencies between the individual micro-service instances exponentially.

Further, cloud computing system 110 may include, or be coupled to, a server and application performance monitoring service 120 that monitors the performance of computing resources 112 in cloud computing system 110. Performance monitoring service 120 may regularly monitor system performance of computing resources 112 over a monitoring time period (e.g., a minute), and may report the system performance data, for example, at regular times (e.g., every minute). The reporting times may be indicated by timestamps in the reports.

Examples of performance monitoring service 120 may include products that are commercially marketed by the assignee, for example, under brand names such as TrueSight AppVisibility, BMC Performance Manager Express for Servers, and BMC Performance Manager for Virtual Servers, etc. Computing resources 112 in cloud computing system 110 (e.g., servers, and other cloud or virtual compute services) may have performance monitoring meters 112*a* installed in them. Meters 112*a* may, for example, observe specific performance aspects or categories (e.g., CPU utilization, context switches, load average, disk reads, disk writes, and network bandwidth usage) of computing resources 112. Meters 112a may communicate the observed performance data, for example, over the Internet via secure https connections to performance monitoring service 120, which may also be running in the cloud. The observed performance data received from performance monitoring service 120 may be stored, for example, in a database (e.g., database 130).

In an example implementation, system 100 (which may be coupled to, or included within, cloud computing system 110) may be configured to generate a topological map of the computing resources in cloud computing system 110 by discovery of performance interdependency relationships between pairs of computing resources 112 in cloud computing system 110. Performance interdependency relationships between pairs of computing resources 112 may be identified by correlating the behavior of individual computing resources 112 in time with the behavior of all other computing resources. In this context, the behavior that is correlated may be based on observations in one or more specific performance categories (e.g., CPU utilization, context switches, load average, disk reads, disk writes, and network bandwidth usage, etc.).

A performance interdependency relationship (hereinafter "dependency relationship") may be found to exist between two specific computing resources when a positive correlation of behavior is observed between the two specific computing resources.

System 100 may include a computing system 140, which in addition to a CPU 141 and a memory 142 may include includes processes (e.g. data collector 143, relationships analyzer 144 and topological map generator 145). Computing system 140 may be configured to determine whether dependency relationships exist between the pairs of computing resources 112, and to generate a topological map of computing resources 112 based on the determined dependency relationships.

Data collector 143 may, for example, collect data on the performance of computing resources 112 gathered by performance monitoring service 120. This collected data may be received directly from performance monitoring service 120 or recovered from an intermediate data store (e.g., database 130).

Relationships analyzer 144 may include statistical processes or algorithms (e.g., correlation, cross correlation, and covariance processes, etc.) to process the data on the performance of computing resources 112. The statistical processes or algorithms may determine which specific pairs of computing resources 112 have dependency relationships.

Figure 2:
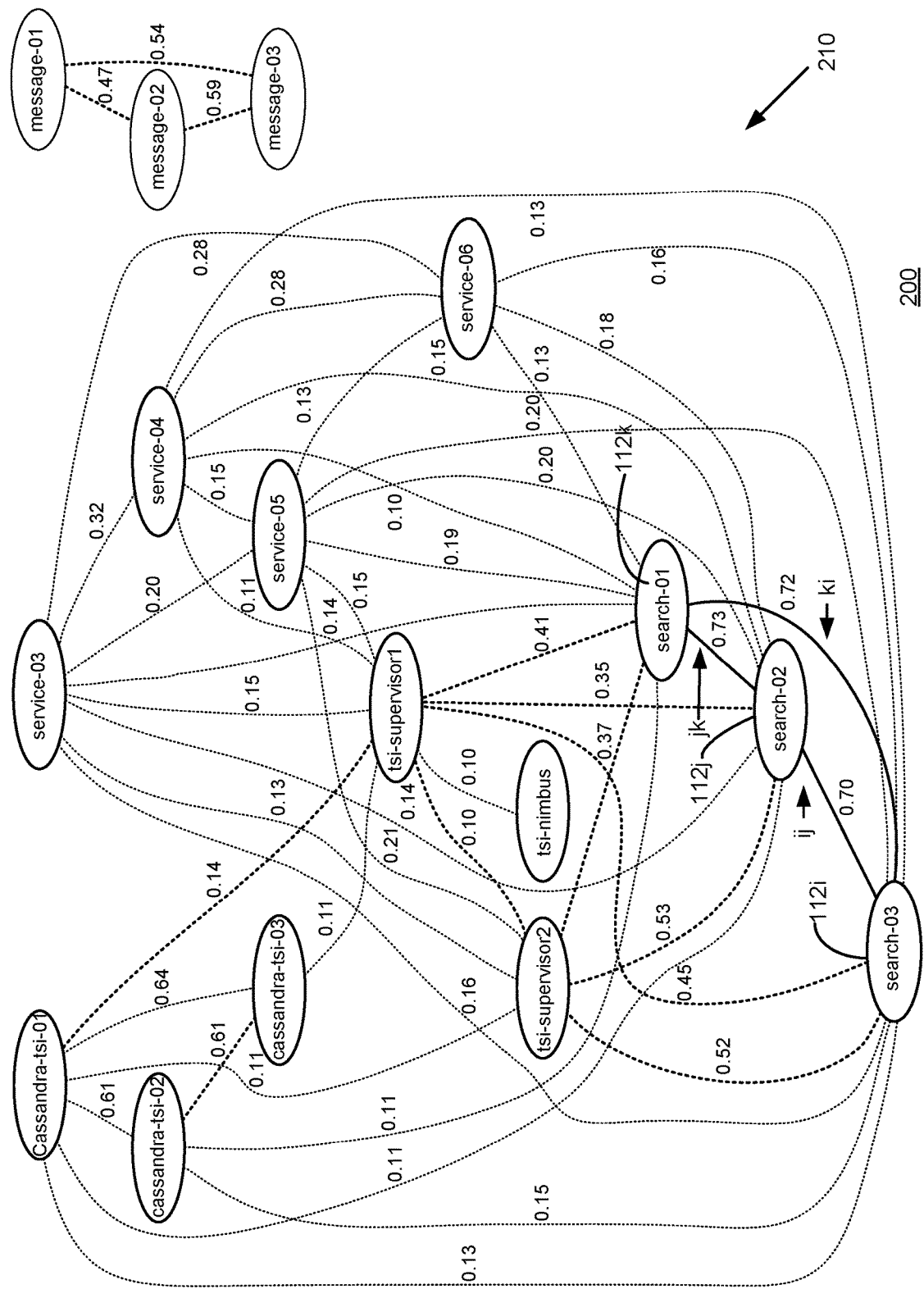
FIG. 2 is an illustration of an example topographic map displaying performance relationships between pairs of computing resources in a computer system, in accordance with the principles of the present disclosure.

Topological map generator 145 may include processes for visualization of the specific pairs of computing resources that have been determined to have dependency relationships. Topological map generator 145 may, for example, generate an undirected graph (also called an "undirected network"), which visually depicts all dependency relationships found by relationships analyzer 144 as connections between the specific pairs of computing resources (e.g., undirected graph 210 in topological map 200, FIG. 2). In the undirected graph, computing resources (e.g. computing resources 112) may be represented by nodes (e.g., nodes 112i, 112j, 112k, etc.) and the observed dependency relationships may be represented by edges (e.g., edges ij, jk, and ki, etc.) connecting specific pairs of nodes. Topological map generator 145 may persist undirected graph 210 in memory 142 or other database (e.g. database 130).

Computer system 140 may continuously update undirected graph 210 with the arrival of new performance data from performance monitoring service 120. Existing dependency relationships between nodes may be removed from undirected graph 210, for example, when they are no longer detectable in the latest set of performance data, or by an aging process that would remove them after a specified period of inactivity.

Computing system 140, which may be hosted on one or more physical or virtual machines, may be accessible to, or connected to, a client computer (e.g., administrator station 150). Administrator station 150, which may be connected to computing system 140, may include a processor 14, a memory 16, and a display 18. An administrator may use computing system 140 to generate topological maps (e.g., topological map 200) of computing resources 112 (e.g., on demand) and to view results, for example, on display 18 of administrator station 150.

In example implementations, computer system 140 may be configured to allow viewers of topological map 200 (e.g., on display 18) an opportunity to validate, modify, enhance, or reject observed dependency relationships that are displayed in undirected graph 210.

Figure 3:
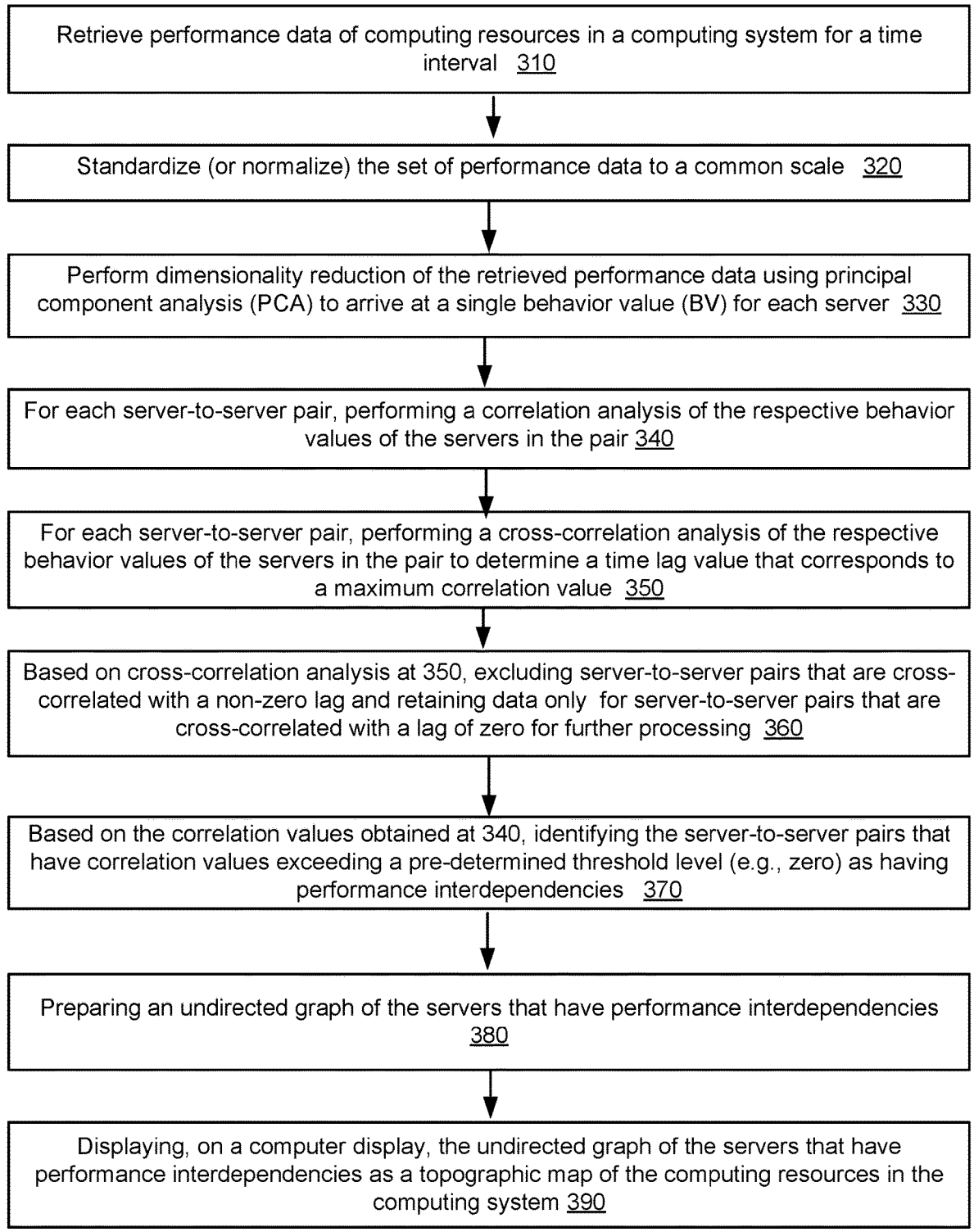
FIG. 3 is a flow chart illustration of an example method for generating topographic maps of the distribution of computing resources (e.g., computing resources 112) of a networked computing system (e.g., a cloud computing system 110), in accordance with the principles of the present disclosure.

FIG. 3 shows an example method 300 for generating topographic maps of computing resources (e.g., computing resources 112) of a networked computing system (e.g., a cloud computing system 110), in accordance with the principles of the present disclosure. Method 300 may be implemented using system 100.

In the following description of method 300, the term "server" is used generically for any type of computer resource (e.g., computer resource 112). However, it will be understood that term may represent any entity (e.g. server, container instance, compute service, etc.) in the networked computing system for which system performance data can monitored (e.g., by performance monitoring service 120). Performance monitoring service 120 may regularly monitor system performance over a monitoring time period, and may report the system performance, for example, periodically (e.g., every minute). The system performance data reports may include timestamps of the reporting time.

In an example implementation, method 300 includes retrieving performance data of computing resources in a computing system for a time interval (310). The retrieved performance data may include performance data in one or more performance categories.

FIG. 4A shows, for example, in tabular form, an example set of performance data for a server that may be retrieved at different times in an example cloud computing system, in accordance with the principles of the present disclosure. The performance data may include data for one or more performance categories (e.g., central processing unit (CPU) utilization, disk reads, disk writes, memory utilization, load average, processor queue length, context switches, and network bandwidth usage, etc.). The specific set of performance data may be received directly from performance monitoring service 120 or retrieved from a database (e.g., database 130).

As shown in FIG. 4A, the retrieved set of performance data for the time interval may, for example, include reports for "m" consecutive reporting times (e.g., indicated by time stamps in the data). Further, the specific set performance data may include performance data for a selected group of one or more performance categories (e.g., CPU utilization, disk reads, disk writes, memory utilization, load average, processor queue length, context switches, and network bandwidth usage, etc.). The retrieved set of data performance may be considered to have "m" by "n" dimensions, with n being equal to the number of performance categories in the selected group.

Dimensionality reduction or dimension reduction is a statistical process of reducing the number of random variables under consideration. In example implementations of method 200, dimensionality reduction may be utilized, for example, to reduce the dimension n (i.e., the number of performance categories) being considered in the selected group.

With renewed reference to FIG. 3, method 300 further includes standardizing (i.e., normalizing) the set of performance data to a common scale (320), and performing dimensionality reduction of the retrieved performance data using principal component analysis (PCA) to arrive at a single behavior value (BV) for each of the computing resources (330).

FIG. 4B shows, for example, a table (e.g., table 410) representing the set of standardized performance data obtained by standardizing the set of performance data 400 (FIG. 4A) to a common scale. Further, FIG. 4C shows, for example, a table (e.g., table 420) with the results of example dimensionality reduction of table 410 using principal component analysis (PCA) to arrive at a one-dimension single behavior value (BV) for each of the m reporting times for server A.

With renewed reference to FIG. 3, method 300 further includes, for each server-to-server pair (e.g., server A and server B) in cloud computing system 110, performing a correlation analysis of the respective behavior values of the servers in the pair (340). This correlation analysis may involve finding an intersect of the timestamps of sets of data for the two servers, and correlating only pairs of respective data sets (e.g., data set 441 and data set 442, FIG. 4C) for the two servers that have exact timestamp matches (i.e., there is zero time lag between the data sets).

FIG. 4D shows, for example, in table 440, example data sets 441 and 442 for servers A and B, respectively, that may be correlated at 340 in method 300. In the example shown in FIG. 4C, data set 441 and data set 442 have the same time stamp values and yield a correlation coefficient "r", for example, of 0.387851 for the correlation of the behaviours of server A and server B.

Any non-zero correlation coefficient r indicates a performance interdependency relationship of the behaviours of server A and server B. However, it is possible that in cloud computing system 110, this performance interdependency relationship of the behaviours of server A and server B may not be a result of a direct connection between server A and server B (i.e., their performance dependency may not be a near neighbor interaction), but may be a "mediated" dependency that is mediated by other intervening servers (e.g., server C, server D, etc.) in cloud computing system 110.

In the mediated dependency cases, the performance behaviours of server A and server B may exhibit a time lag (or time shift), which can be determined by cross-correlating the data sets (e.g., data set 441 and data set 442, respectively) for server A and server B.

With renewed reference to FIG. 3, method 300 may further include, for each server-to-server pair (e.g., server A and server B) in cloud computing system 110, performing a cross-correlation analysis of the respective behavior values of the servers in the pair to determine a time lag value that corresponds to a maximum correlation value r.

FIG. 4E shows, for example, in table 440, example cross correlation results (e.g., for server A and server B) that indicate that the maximum correlation value CV (r=0.38756) occurs at a time lag equal to zero. FIG. 4F shows, for example, in table 450, example cross correlation results (e.g., for another server pair) that indicate that the maximum correlation value CV (r=0.76290499) occurs at a time lag equal to 3.

With renewed reference to FIG. 3, method 300 may further include, based on cross-correlation analysis results at 350, excluding server-to-server pairs that are cross-correlated with a non-zero lag, and retaining data only for server-to-server pairs that are cross-correlated with a lag of zero for further processing (360).

Method 300 may further include, based on the correlation values obtained at 340, identifying the server-to-server pairs that have correlation values exceeding a pre-determined threshold level (e.g., zero) as having performance interdependencies (370).

In example cloud computing system scenarios, there could be many server-to-server pairs in the cloud computing system that have zero correlation. This information in itself may be useful as the server pairs that have zero correlation can be regarded as being totally independent of each other (i.e. as having no performance interdependency relationship) when reconfiguring or modifying the computing resources in the cloud computing system.

Method 300 may further include preparing an undirected graph of the servers that have performance interdependencies (380), and displaying the undirected graph of the servers that have performance interdependencies as a topographic map of the servers in the computing system (390).

In the undirected graph, each pair of servers may be represented as a pair of nodes, and their performance interdependency may be represented as an edge connecting the nodes. In example implementations, the edge may be annotated with the correlation values r to visually indicate the strength of the performance interdependency of the pair of servers. Preparing the undirected graph of the servers 380 may involve preparing an "adjacency" matrix representing a finite graph from the data identifying the server-to-server pairs that have correlation values exceeding a pre-determined threshold level at 360. Elements of the adjacency matrix may indicate whether pairs of vertices are adjacent or not in the undirected graph. In example implementations, the pre-determined threshold level may be exactly zero or a number about zero.

Figure 5:
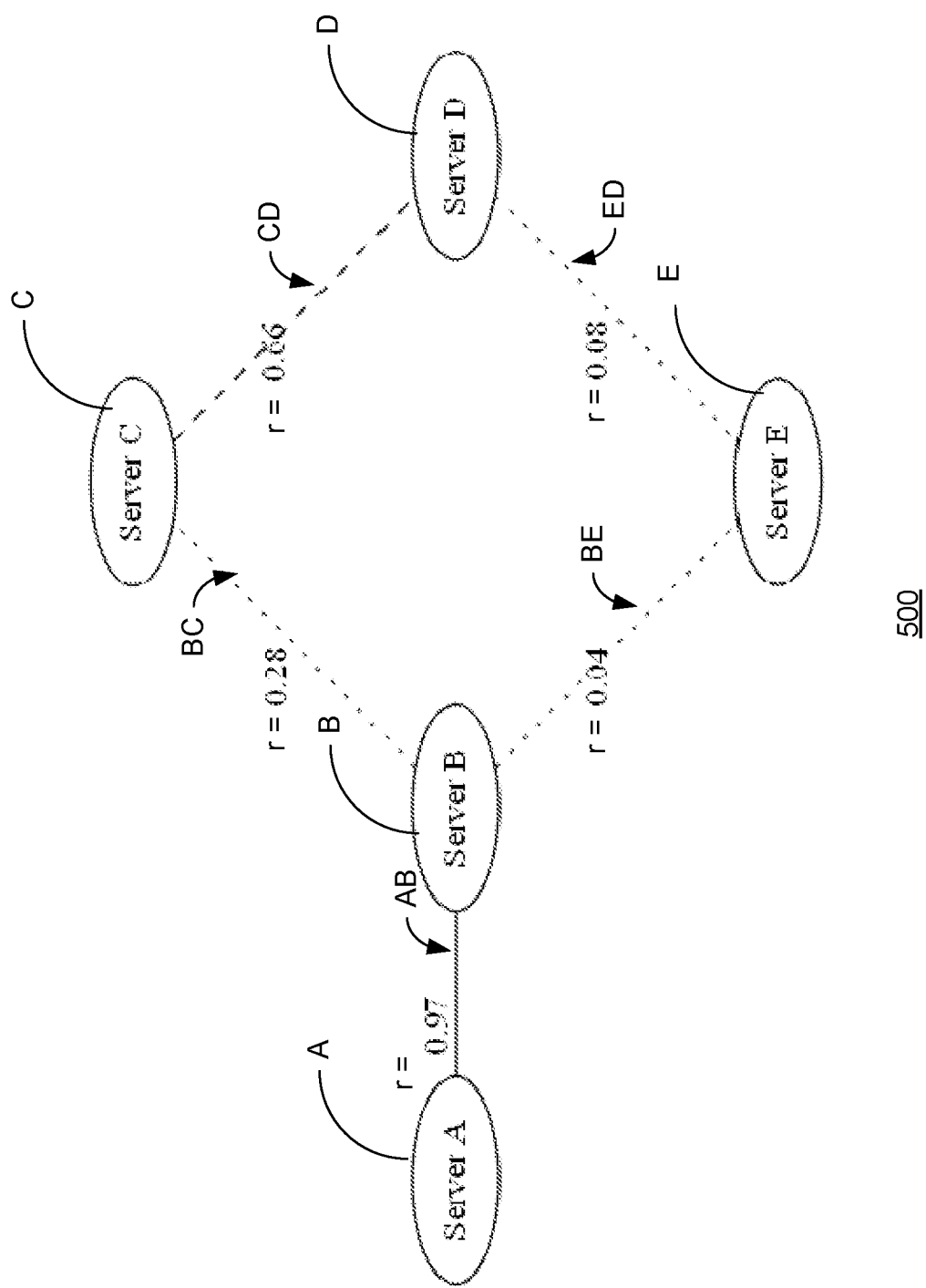
FIG. 5 is an illustration of a snippet of an example undirected graph that may represent the topology of servers in the networked computing system, in accordance with the principles of the present disclosure.
Figure 6:
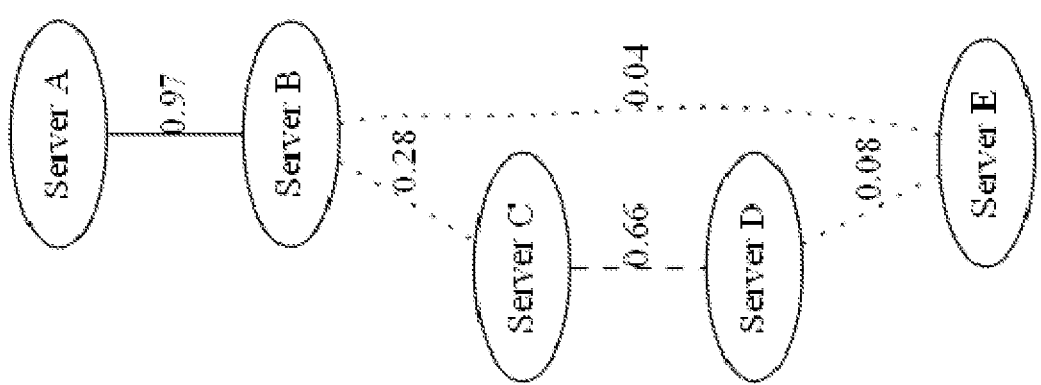
FIG. 6 is an illustration of the snippet of the example undirected graph of FIG. 5 in another type of graph layout, in accordance with the principles of the present disclosure.

FIG. 5 shows, for example, a snippet of an undirected graph 500 that may represent the topology of servers of the networked computing system. In undirected graph 500 servers (e.g., server A, server B, server C, server D, and server E) are represented as nodes A, B, C, D and E, respectively. Edges AB, BC, BE, BE, CD and CE depict the dependency relationships between server-to-server pairs A and B, B and C, B and E, C and D, C and E, respectively. The edges may be annotated with respective numerical correlation values r depicting the "strength" of the performance interdependency represented by the edge. Undirected graph 500 is shown in FIG. 5 in an Method 300 may include presenting an image of the undirected graph (e.g., undirected graph 500) on a display (e.g., display 18, FIG. 1). The displayed graph may have a specific layout (e.g. circular, orthogonal, spectral, force based or other graph layout). Undirected graph 500 is shown in FIG. 5, for example, in a circular graph layout, while FIG. 6 shows, for example, undirected graph 500 displayed in a layered graph layout.

In an example scenario, the undirected graph may have a large size (e.g., in proportion number of servers in the networked computing system). In an example implementation, method 300 may include finding a giant component (i.e., a connected component that contains a constant fraction of the entire graph's vertices) to display the large size undirected graph in manageable size view portions.

Method 300 may further include iteratively, performing steps 310-380 repeatedly (e.g., every N seconds) to continually update or refresh the undirected graph (e.g., undirected graph 500) to represent a current status of the servers in the networked computing system.

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method for determining topological connections of a plurality of computing resources in a cloud computing system, the method comprising:
   determining performances of each computing resource in the cloud computing system;
   for each computing resource-to-computing resource pair in the cloud computing system, performing a correlation analysis of the determined performances of the computing resources in the pair;
   determine the topological connections of the plurality of computing resources in the cloud computing system, based on the correlation analysis, including identifying each computing resource-to-computing resource pair that has a performance correlation value exceeding a pre-determined threshold level as being a topologically connected computing resource-to-computing resource pair;
   assigning each performance correlation value exceeding the pre-determined threshold level to each corresponding topological connection between each corresponding computing resource-to-computing resource pair; and
   preparing a graph of the topologically connected computing resource-to-computing resource pairs, based on the identifying of each computing resource-to-computing resource pair having the performance correlation value exceeding the pre-determined threshold level, and on the assigning of each performance correlation value exceeding the pre-determined threshold level to each corresponding topological connection.

2. The method of claim 1 further comprising:
   after performing the correlation analysis, performing a cross-correlation analysis of the determined performances of the computing resources in the pair to determine a time lag value that corresponds to a maximum performance correlation value.

3. The method of claim 2 further comprising:
   based on the cross-correlation analysis, excluding computing resource-to-computing resource pairs that are cross-correlated with a non-zero lag and retaining only computing resource-to-computing resource pairs that are cross-correlated with a time lag of about zero for further processing.

4. The method of claim 2, wherein preparing the graph includes:
preparing an adjacency matrix representing a finite graph, based on the correlation analysis identifying the computing resource-to-computing resource pairs that have performance correlation values exceeding the pre-determined threshold level.

5. The method of claim 4, wherein the pre-determined threshold level corresponds to a correlation value of about zero.

6. The method of claim 1, wherein the performances include one or more of central processing unit (CPU) utilization, disk reads, disk writes, memory utilization, load average, processor queue length, context switches, and network bandwidth usage.

7. The method of claim 1 further comprising:
before performing the correlation analysis, performing dimensionality reduction to arrive at a single performance value for each of the computing resources in the cloud computing system.

8. The method of claim 1 further comprising:
displaying, on a computer display, the graph as a topographic map of the computing resources in the cloud computing system, including displaying the topological connections between computing resource-to-computing resource pairs, and providing the assigned performance correlation values for corresponding ones of the topological connections.

9. A computer system comprising:
a processor;
a memory;
a data collector configured to:
determine a plurality of performances of each computing resource in a cloud computing system;
a relationships analyzer configured to:
for each computing resource-to-computing resource pair in the cloud computing system, perform a correlation analysis of the determined performances of the computing resources in the pair; and
determine, based on the correlation analysis, the topological connections of the plurality of computing resources in the cloud computing system by identifying each computing resource-to-computing resource pair that has a performance correlation value exceeding a pre-determined threshold level as being a topologically connected computing resource-to-computing resource pair
assign each performance correlation value exceeding the pre-determined threshold level to each corresponding topological connection between each corresponding computing resource-to-computing resource pair; and
a topological map generator configured to:
prepare a graph of the topologically connected computing resource-to-computing resource pairs, based on the identifying of each computing resource-to-computing resource pair having the performance correlation value exceeding the pre-determined threshold level, and on the assigning of each performance correlation value exceeding the pre-determined threshold level to each corresponding topological connection.

10. The computer system of claim 9, wherein the relationships analyzer is configured to:

after performing the correlation analysis, perform a cross-correlation analysis of the determined performances of the computing resources in the pair to determine a time lag value that corresponds to a maximum performance correlation value.

11. The computer system of claim 10, wherein the relationships analyzer is further configured to:
based on the cross-correlation analysis, exclude computing resource-to-computing resource pairs that are cross-correlated with a non-zero lag and retain only computing resource-to-computing resource pairs that are cross-correlated with a time lag of about zero for further processing.

12. The computer system of claim 10, wherein the topological map generator is configured to:
prepare an adjacency matrix representing a finite graph, based on the correlation analysis identifying the computing resource-to-computing resource pairs that have correlation values exceeding the pre-determined threshold level.

13. The computer system of claim 9, wherein the relationships analyzer is configured to:
before performing the correlation analysis, perform dimensionality reduction to arrive at a single performance value for each of the computing resources in the cloud computing system.

14. A computer program product for determining topological connections of a plurality of computing resources in a cloud computing system, the computer program product including instructions recorded on a non-transitory computer-readable storage medium and configured to cause at least one processor to:
determine performance of each computing resource in the cloud computing system;
for each computing resource-to-computing resource pair in the cloud computing system, perform a correlation analysis of the determined performances of the computing resources in the pair;
determine, based on the correlation analysis, the topological connections of the plurality of computing resources in the cloud computing system by identifying each computing resource-to-computing resource pair that has a performance correlation value exceeding a pre-determined threshold level as being a topologically connected computing resource-to-computing resource pair;
assign each performance correlation value exceeding the pre-determined threshold level to each corresponding topological connection between each corresponding computing resource-to-computing resource pair; and
prepare a graph of the topologically connected computing resource-to-computing resource pairs, based on the identifying of each computing resource-to-computing resource pair having the performance correlation value exceeding the pre-determined threshold level, and on the assigning of each performance correlation value exceeding the pre-determine threshold level to each corresponding topological connection.

15. The computer program product of claim 14, wherein the instructions, when executed, are further configured to cause the at least one processor to:
after performing a correlation analysis, perform a cross-correlation analysis of the determined performances of each computing resource-to-computing resource pair to determine a time lag value that corresponds to a maximum performance correlation value.

16. The computer program product of claim 15, wherein the instructions, when executed, are further configured to cause the at least one processor to:

based on the cross-correlation analysis, exclude computing resource-to-computing resource pairs that are cross-correlated with a non-zero lag and retain only computing resource-to-computing resource pairs that are cross-correlated with a time lag of about zero for further processing.

17. The computer program product of claim 14, wherein the instructions, when executed, are further configured to cause the at least one processor to:

when preparing the graph, prepare an adjacency matrix representing a finite graph, based on the correlation analysis data identifying the computing resource-to-computing resource pairs that have performance correlation values exceeding the pre-determined threshold level.

18. The computer program product of claim 14, wherein the instructions, when executed, are further configured to cause the at least one processor to:

before performing the correlation analysis, perform dimensionality reduction to arrive at a single performance value for each of the computing resources in the cloud computing system.

19. The computer program product of claim 14, wherein the instructions, when executed, are further configured to cause the at least one processor to:

update the undirected graph to represent a current status of the computing resources in the cloud computing system.

20. The computer program product of claim 14, wherein using the correlation analysis to determine the topological connections involves detection of connections between computing resources by recognizing a topological connection between two computing resources upon detection of a performance or service interdependency relationship between the two computing resources.

* * * * *